Sept. 24, 1929. G. B. IRELAND 1,729,289
APPARATUS FOR RECORDING PULSATING PRESSURE
Original Filed July 22, 1926  2 Sheets-Sheet 1
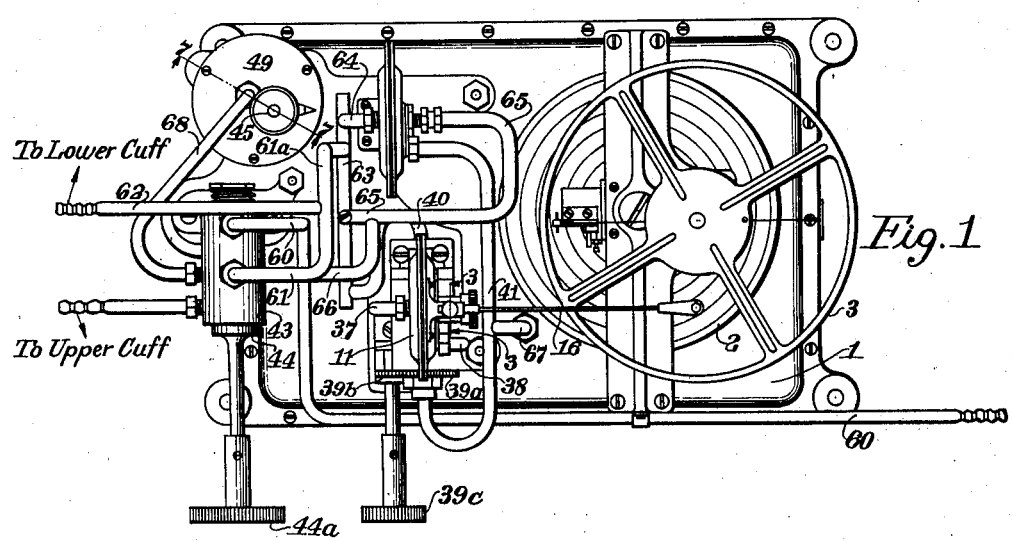
INVENTOR:
George B. Ireland
BY
Alfred Bungler
his ATTORNEY Sept. 24, 1929.　　　G. B. IRELAND　　　1,729,289
APPARATUS FOR RECORDING PULSATING PRESSURE
Original Filed July 22, 1926　　2 Sheets-Sheet 2
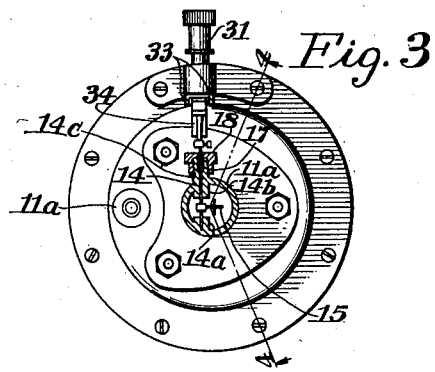
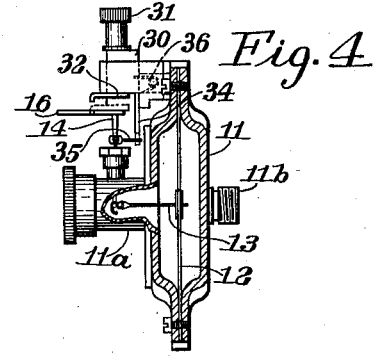
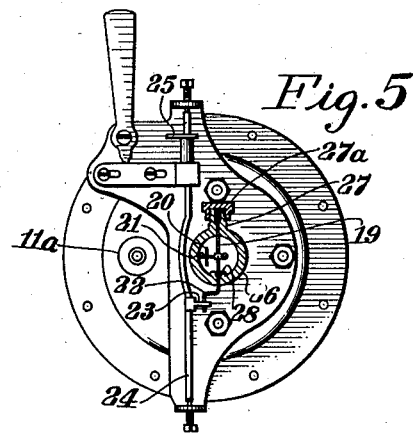
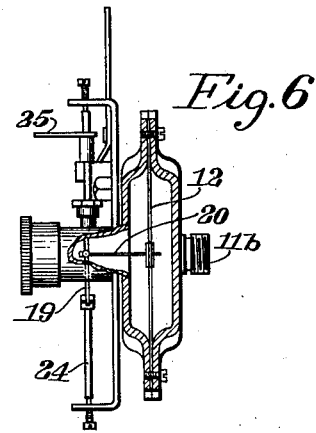
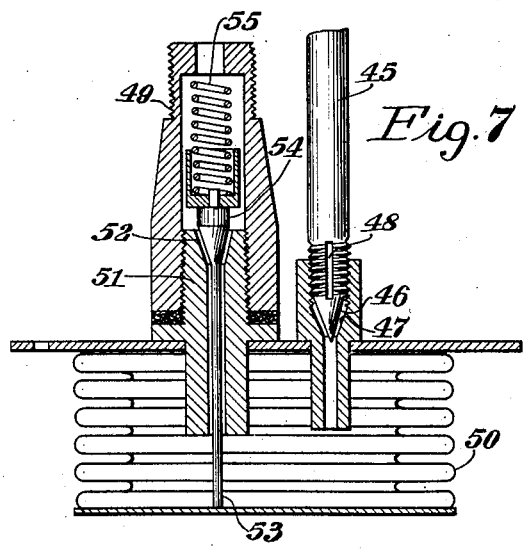
INVENTOR:
George B. Ireland
BY Alfred K. Burger
his ATTORNEY Patented Sept. 24, 1929

1,729,289

UNITED STATES PATENT OFFICE

GEORGE B. IRELAND, OF ROCHESTER, NEW YORK, ASSIGNOR TO TAYLOR INSTRUMENT COMPANIES, OF ROCHESTER, NEW YORK, A CORPORATION OF NEW YORK

APPARATUS FOR RECORDING PULSATING PRESSURE

Original application filed July 22, 1926, Serial No. 124,220. Divided and this application filed December 12, 1927. Serial No. 239,397.

This invention relates to improvements in apparatus for measuring and recording pulsating pressures and more in particular to improvements in apparatus of the type disclosed in the patent to Levin No. 1,532,705.

While the invention, as indicated, is of relatively broad scope, the novel points will be described as embodied in a recording sphygmomanometer.

It is a general object of the invention to distinctly indicate and record the pressure conditions from the maximum pressure during contraction of the heart or systole to the minimum pressure during the periods of rest intermediate the constractions i. e. the periods of diastole and, more particularly, to produce records from which the critical factors may be readily determined.

It is a more particular object of the invention to provide mechanism for more effectively translating pulsating pressure reactions of the blood upon the constricting cuff mechanism into accurately responsive movement of the recording pen or other like mechanism.

The objects of the invention will be more apparent from a detailed description in connection with the accompanying drawings and the novel parts will be particularly pointed out in the claims.

In the drawings

Fig. 1 is a plan view of a recording sphygmomanometer embodying the invention.

Fig. 2 is a side elevation thereof;

Fig. 3 is a sectional view of a detail forming part of the invention;

Fig. 4 is a sectional view of the same detail taken substantially on line 4—4, Fig. 3;

Figs. 5 and 6 are views similar to Figs. 3 and 4 of another form of the same mechanism;

Fig. 7 is a sectional view taken substantially on line 7—7, Fig. 1; and

Fig. 8 is an enlarged perspective view of the recording pen.

In the drawings 1 represents a pneumatic tank to which is connected a pressure-responsive device 2, preferably of the diaphragm type, which is so connected with a recording disk 3 that the latter will assume different angular positions for different pressure conditions within the tank and will always assume the same angular position for the same pressure condition. The mechanism for translating the expansive and contractive movement of the diaphragm may have different forms. In the particular arrangement it includes what is in effect a lever 4 pivoted at 5, one end of the lever bearing upon the diaphragm (not shown) and the other end carrying an arm 6 with the effect that upward movement of the diaphragm will turn lever 4 about its pivot in one direction and downward movement of the diaphragm will allow the arm 4 to swing in opposite direction.

Upon a support 7 is mounted a spindle 8 shown in dotted lines in Fig. 2. The spindle carries at its upper end the recording disk 3 and intermediate its ends it is engaged by a wire 9. The latter is connected at one end to the arm 6 and at its other end to a leaf spring 10, a plurality of convolutions engaging the spindle 8. The arrangement is such that upon an increase in pressure and movement of the arm 6 to the left, the disk is turned in one direction and the leaf spring 10 is deflected toward the left while upon a decrease of pressure the leaf spring 10 will haul in the slack and will turn the arm 6 to the right to maintain the free end of the lever 4 in contact with the diaphragm 2. There is always a balance between the action of the diaphragm 2 and the action of leaf spring 10 and the position of the recording disk is always an indication of the pressure within the tank.

The arrangement above described does not form part of the invention and has been referred to only in order to bring out more fully the relationship thereof to the parts representing the invention.

Some of the principal points of novelty are are embodided in the pressure-responsive mechanism for effecting the record upon the recording disk. This mechanism, which may be termed an oscillograph or oscillometer inasmuch as a diaphragm which is sensitively responsive to pressure changes, oscillates as a function of the variations in pressure conditions due to the pulsations of the blood, comprises mainly a housing 11 enclosing a highly sensitive diaphragm 12 more fully shown in Fig. 4, and mechanism for translating the oscillations. This latter mechanism includes principally a stem 13 secured to the diaphragm 12 at the geometrical center thereof and a shaft 14 having a crank arm 15 to which the stem is connected. The shaft 14 carries at its end an arm 16 provided with a pen, a stylus or any other form of writing element.

The translation of the oscillations of the diaphragm 12 represents a difficult problem because the variations of pressure involved are small and it is for that reason essential that friction be reduced to a minimum, more particularly in view of the fact that the use of a pen or other equivalent element introduces a friction factor which cannot be avoided or eliminated. On the other hand, the housing 11 must be air-tight. The translation of the motion of the diaphragm 12, therefore, from within the casing or housing 11 to the outside must not be attended by a leak or leaks. The construction shown in Figs. 3 and 4 represents what I believe to be the best solution of the problem.

The casing 11 includes a tubular portion 11$^a$ concentrical with the diaphragm 12 and the stem 13 extends into this tubular portion 11$^a$. The shaft 14 extends transversely of the tubular portion 11$^a$ laterally of the center thereof to afford a proper disposition of the crank arm 15. The shaft 14 has one end supported in the wall of the portion 11$^a$, preferably by the application of an internal boss 14$^a$, while the other end extends through a second internal boss 14$^b$ and an external projection 14$^c$. The internal boss 14$^b$ provides an extended bearing while the external projection 14$^c$ provides a well 17 for a sealing medium. The bore providing the bearing in the boss 14$^a$ and the bore in boss 14$^b$ are so chosen that the friction is very small, the shaft 14 being normally in a vertical position. The well 17 is relatively deep so that the sealing material effectively prevents a leak along the shaft 14. The sealing material must be a material of a sufficient degree of viscosity to be retained in the well and must have the property of maintaining sealing contact with the shaft without causing undue friction. Of the various materials experimented with I found petrolatum to be best suited for the special purpose, although other semi-solid or highly viscous materials having lubricating property are generally applicable.

In practice, I provide a cap 18 for closing the well 17. This cap may be removed for replenishing the petrolatum and normally serves to maintain the petrolatum in effective position.

The construction illustrated in Figs. 5 and 6 is generally similar to the construction shown in Figs. 3 and 4. However, the shaft 19 which is connected with the stem 20 through the crank arm 21 has at its end a crank portion 22 which in turn is connected to an arm 23 on a shaft 24 carrying the pen arm 25. The tubular portion 26 has a lateral projection 27 defining a well holding the sealing material and a cap 27$^a$ forms a closure. In this instance the shaft 19 extends merely into the well. The opposite side of the tubular portion 26 is internally provided with a boss 28 having a cup-shaped depression for holding the sealing material.

In order to facilitate adjustment of the pen arm 16 relatively to the shaft 14, I provide the following arrangement. The pen arm 16 is frictionally secured upon shaft 14. Upon the casing 11 is mounted a slide piece 30 in which is mounted a spindle having at its outer end a finger piece 31 and at its inner end a crank arm 32 provided at its free end with a fork 33 adapted to straddle the pen arm 16 when the slide piece 30 is pushed inwardly. From the slide piece 30 which has an angular cross-section to avoid rotary motion, extends an arm 34 forked at its front end to straddle a pin or arm 35 which is secured to the shaft 14 or is otherwise rigidly connected therewith. The arrangement is such that the arm 34 engages the arm 35 and thereby prevents rotation of the shaft 14 when the fork 33 is in engagement with the pen arm 16. To effect adjustment, the slide piece 30 is pushed inwardly and the finger piece 31 is turned to rotate the spindle carrying the fork 33, whereby the pen arm is angularly moved relatively to the shaft 14, which is held stationary by the interengagement of the arm 34 and the arm 35. A spring 36 returns the slide piece into the original position.

The casing 11 of the oscillometer is provided with nipples 11$^a$ and 11$^b$ for pneumatic connections with conduits 37 and 38 respectively which by means of a rotary valve 39 may be placed in communication with conduits 40 and 41 respectively. The conduits 37 and 38 also serve as the support of the oscillometer, the arrangement being such that when the oscillometer is in the normal vertical position shown in Figs. 1 and 2, the pneumatic communication between the conduit 40 and the conduit 37, on the one hand, and between the conduit 41 and the conduit 38, on the other hand, is established while when the oscillometer is angularly turned to the left, having reference to Figs. 1 and 2, the communication is ineffective. This arrangement has the object to permit the movement of the pen arm away from the disk 3 and to avoid injury to the pen arm while the latter is unsupported by the disk, as will more fully appear later on.

In addition to the oscillometer just described, the apparatus includes a regulator, an adjustable leak, various conduits and connections, and a valve mechanism for changing the connections.

The regulator is in substance a diaphragm device similar to the oscillometer, with the difference that the diaphragm operates to open and close a conduit as will be more fully pointed out.

The valve mechanism consisting of a stationary member 43 and a rotary member 44 is adapted to have two positions for controlling the flow of fluid, for inflating and for deflating respectively.

The leak mechanism includes a valve stem 45 having a valve 46 co-operating with a corresponding seat 47, the stem having a groove 48 extending upwardly from the conical valve surface. Thus, by adjusting the valve nearer or farther away from its seat, the rate of flow of air through the groove can be regulated between the maximum amount dependent upon the pressure and the cross-section of the groove and a minimum which may be practically zero.

In order to automatically make the rate of leak substantially independent of the changes in pressure, I provide a compensating mechanism as follows: The resiliently expansible container 50 of well known construction has an outlet defined by the valve 46, seat 47 and a grooved stem 45, as described and an inlet 49 including a tube 51 having a valve seat 52 and a valve stem 53 having a valve 54 for co-operation with the valve seat 52. The valve is closed by downward movement under the action of a spring 55. Under the action of the pressure within the container 50, the latter expands and contracts and, in general, assumes definite positions at definite pressures. The length of the stem 53 has been so chosen that between predetermined limits of pressure the stem is lifted from its seat against the tension spring 55. Above a certain pressure the bottom of the container is moved outwardly so far that the bottom of the stem 53 does not touch it when the valve is entirely closed. As the pressure decreases, the inward movement of the bottom of the container gradually moves the valve farther away from its seat and thereby varies the flow of air within wide limits. While valve 46 may be set for any desired leak, the valve 54 represents an orifice varying automatically in inverse proportion to the pressure so that the volume of leak per unit of time is substantially constant.

The conduits for effecting the operation of the device are as follows:

The pipe 60 is the service pipe which may be connected to a bulb or other pressure-producing device and leads to the valve 43. In the inflating position of the valve, the pipe 60 is connected with the conduit 61 which has two branches i. e. pipe 62 leading to the lower or main cuff and pipe 61$^a$ which is connected to a pipe 63 serving as a manifold for pipe 64 leading to one side of the regular diaphragm, pipe 65 leading to the other side of the regulator diaphragm and pipe 40, previously mentioned, leading to the valve 39. The pipe 65 is connected to the manifold pipe 63 through a constricted upright portion 65$^a$ having at its upper end a removable closure 65$^b$ whereby access may be had to it for cleaning purposes. In case the restricted portion 65$^a$ should become clogged, the closure 65$^a$ may be removed and a fine wire pin may be inserted.

The pipe 65 is connected by means of a pipe 66 to the valve casing 43. The conduit 41 which is at one end connected to the valve 39, as previously mentioned, is connected at its other end to the same side of the regulator diaphragm to which the pipe 65 is connected. While the pipe 65 opens into the diaphragm casing centrally thereof, pipe 41 makes connection with the casing laterally of the center. Pipe 41 is connected intermediate its ends with the tank 1 by means of a section 67.

From the valve casing 43 a connection is made to the inlet 49 to the leak mechanism by means of a section 68. A separate nipple 69 serves the purpose to make connection from the valve casing 43 directly to the upper cup and a connection 70 leads from the valve directly to the tank 1.

The operation of the apparatus described is as follows: Assume that the double cuff unit has been properly placed upon the arm and is ready to be inflated. The valve 44 is then adjusted by means of the knob 44$^a$ to set it for the inflating operation. In that position of the valve 44 air then flows from the usual hand bulb or the like through pipe 60 to the valve casing 3, then through the pipe 61 and through the pipe connection 62 to the lower or main cuff and at the same time through connection 70 to the tank and through nipple 69 to the upper cuff. From pipe 61 air flows at the same time through the connection 61$^a$ to the manifold pipe 63 and from the latter through connections 64 and 40 to one side of the regulator and the oscillometer respectively. From the tank air is free to flow through the connection 67 and the pipe 41 to the opposite sides of the regulator and the oscillometer.

As the pressure increases in the tank, the diaphragm 2 expands and the disk is caused to rotate an angular distance which is strictly proportional to the pressure. The record sheets placed on the disk 3 for receiving the record are accordingly provided with curvilinear generally radial pressure lines which in conjunction with the pen or stylus 16$^a$ indicate the pressure condition within the tank 1 and since the tank 1 and the cuffs are pneumatically interconnected, also indicate the pressure condition in the cuffs.

Since according to general practice the pressure measurements are made during deflation, the record is likewise made during deflation. The oscillometer together with the pen arm are preferably turned about the valve 39 as pivot, as previously indicated, before the beginning of the inflation and are turned back into normal position when a pressure is reached which is assumed to be higher than the blood pressure to be tested. The valve 44 is set for deflation.

Now the air from the upper cuff flows back through connection 69 into the tank and from the lower or larger cuff it flows back through connection 62, connection 61$^a$, pipe 63 and the constricted portion 65$^a$ into pipe 65 and from there through the pipe 66 through the valve connections into pipe 68, then through the compensating or regulating device 49 into the flexible container 50 and then out through the lead defined by the valve 46 and seat 47.

The leak may be adjusted by hand to bring about a gradual and relatively slow rate of deflation by turning the knurled disk 45$^a$ whereby the valve 46 may be opened to the desired extent. The rate at which the air tends to rush out through the vent channel 48 is proportional to the pressure within the cuffs and the tank and therefore would gradually decrease from a maximum at the beginning of the deflation period to the end thereof, but for the provision of the compensating device. The latter functions as follows: At the beginning of the deflation operation the rush of air into the expansible vessel 50 causes pressure to build up therein, which in turn causes expansion of the vessel. The bottom of the vessel 50, in consequence, is forced downwardly allowing the valve stem 53, which is acted upon by the spring 55, to follow and thereby more or less close the valve depending upon the pressure. The flow of air is thus more or less throttled or even stopped by the valve 54 until the air is allowed to leak off through the channel 48 sufficiently to reduce the pressure in the vessel 50 causing again a contraction thereof and the lifting of the valve 54 from its seat 52. In reality there is always a balance between the pressure in the tank and the cuffs, on the one side, and the vessel 50, on the other side, so that the pressure in the vessel 50 is substantially uniform and the rate of flow through the leak is substantially uniform for the usual ranges of pressure measurements met with, from a maximum of systolic pressure to a minimum of diastolic pressure met within practice.

The compensator shown and described has been found to maintain a uniform rate of decrease of pressure with the result that the record chart is moving at a uniform rate of angular velocity and the distances on the record chart between the pulse beats are substantially uniform, which is of great practical importance for the interpretation of the record.

Simultaneously with the flow of air from the lower cuff to the leak, as just explained, air flows from the tank through the pipe 67, then through the pipe 41 to one side of the diaphragm of the regulator, out through pipe 65 into pipe 66 from where it passes on together with the air from the lower cuff.

It is absolutely essential that the pressure conditions in the cuffs and in the tank be the same. It is equally essential that the impulses due to the action of the pulse pressure upon the lower cuff and transmitted by the fluid transmitting medium to the translating mechanism, be accurately indicated and recorded. The two objects are obtained in the following manner:

The diaphragm of the regulating device is in direct communication on one side with the air in the lower cuff, and on the opposite side with the air in the tank. When due to the constricted portion 65$^a$ the air in the tank should flow to the leak at a higher rate than the rate of flow from the lower cuff, the pressure on the cuff side of the regulator diaphragm would increase relatively to the pressure on the tank side thereof and would cause a flexing of the diaphragm toward the lower pressure side. The diaphragm carries a valve element of any desired form, preferably a ball (not shown) which closes the inlet to pipe 65 and thus stops the flow of air from the tank to pipe 65 until the pressures on opposite sides of the diaphragm have been equalized. In practice the relation between the diaphragm and the valve is so adjusted that a very slight increase of pressure upon the cuff side operates to stop the flow of air from the tank. The regulator thus acts as a sensitive equalizer to maintain a pneumatic balance between the cuff and the tank.

In addition to this important function, the regulator operates to direct the impulses originating in the lower cuff and transmitted through pipe 62 to the side of the oscillometer diaphragm connected directly with the cuff through pipe 40 and prevent transmission to the opposite side of the diaphragm or dissipation in the tank. Thus when impulses are transmitted from the lower cuff, the variations in the pressure react upon the diaphragm of the regulator while at the same time they react upon the oscillometer diaphragm. As soon as the pressure increases due to an impulse, the regulator diaphragm closes the valve and the latter stays closed until the pressure has again decreased to the normal pressure in the cuff and the tank. The regulator diaphragm thus effectively interrupts pneumatic communication between the lower cuff and the tank and the tank side of the oscillometer diaphragm connected therewith while an impulse is transmitted. The impulses are therefore prevented from either being dissipated in the tank or from passing also to the tank side of the oscillometer diaphragm, but are directed in full magnitude to the cuff side of the oscillometer diaphragm where they act upon the latter against the pressure in the tank. The flexing of the diaphragm as a function of the pulse pressure over and above the opposing pressure in the lower cuff is therefore a maximum in the sense that the pressure waves transmitted from the cuff are received in full force by the oscillometer diaphragm.

The diaphragms of both the oscillometer and the regulator must be highly sensitive to variations of pressure conditions, as previously stated. Various metals, such as admiralty nickel metal, aluminum, steel, brass and bronze sufficiently thin to be highly responsive were found unsuitable for the reason that they did not assume and retain any definite neutral position but on the slightest change of pressure snapped into a position either on one side or on the other side of a neutral position and thus absolutely fail of their purpose during a material period of the pulsation and introduce into the record oscillations which are purely a function of the unstable mechanical characteristics of the diaphragms just stated.

Diaphragms of materials such as parchment or the like were found to be so materially affected by moisture in the air that the changes in the sensitiveness caused thereby and the variations in the record as the result thereof make the apparatus unsuitable.

I have found that celluloid while slightly hygroscopic is entirely suitable under ordinary atmospheric conditions. However, in order to guard generally against the effects of moisture, a shield against the action of moisture may be applied in the form of very thin alum-tanned colon leather or the like, as more fully described in the Patent No. 1,630,292 granted to James Ely.

The celluloid diaphragm is not only highly sensitive to variations in pressure, but, what is equally important, yields strictly in proportion to the variations in pressure and assumes and retains a definite neutral position when the pressures on opposite sides are equal.

The action of the regulator is supplemented by the effect of the constricted conduit portion 65ª. While the constriction permits of a suitable rate of deflation, its cross-section is so small relatively to the other conduits that it represents in substance a throttle or choke so far as the transmission of the impulses are concerned. As the immediate result of this throttling effect the regulator diaphragm has closed the pipe 65 before a substantial part of the impulse energy can be dissipated in its effort to pass through the constricted portion 65ª into pipe 65 toward the tank. It should be noted that it is neither desirable nor practical to so closely adjust the valve operated by the regulator diaphragm that a very slight unbalancing of the pressure relations on opposite sides thereof causes the closing of the valve. In order, therefore, to retard the propagation of the pressure wave of the impulse and thereby prevent it from reaching the tank side of the diaphragm through the pipe 65 before the diaphragm is sufficiently flexed to close the latter, the constriction is introduced as the retarding element. Once the pipe 65 is closed by the diaphragm and the valve carried thereon, the pressure increase that may actually take place in pipe 65 can act only upon the minute area of the valve as against the pressure effective upon the whole surface of the diaphragm at the cuff side, and cannot operate to counteract the opposing pressure. Moreover, the building up of pressure within pipe 65 effectively stops a substantial flow of air through the constriction so that the amount of energy dissipated in pipe 65 is insignificant and substantially the whole of the energy derived from the impulse is transmitted to the oscillometer diaphragm and translated thereby to the recording mechanism.

The loss of energy in the translating mechanism to the record chart is very small due principally to the particular mode of sealing the inevitable passage of the mechanism out of the oscillometer housing.

The vertex of the conical protuberance while representing a sharp pen point is in fact rounded and causes much less friction than a metallic pen point of the usual type.

During deflation the pipe 69 is directly connected with the tank 1. The free communication thus brings about a continuous equalization of pressure between the upper cuff and the tank. The pressure indication of the indicating and recording mechanism is therefore a reliable criterion of the pressure in the upper cuff which is the constricting cuff.

In the foregoing I have described a specific form of apparatus for accomplishing the objects of the invention and I have pointed out the advantages thereof.

This application is a division from my application Serial No. 124,220 filed July 22, 1926.

What I claim as my invention is:

1. In apparatus of the character described, the combination of a chart holder, a pressure-sensitive device, a pen arm operatively connected therewith and cooperating with the chart holder, means for pivotally supporting the pressure-sensititve device and the pen arm as a unit, a fluid connection to the pressure-sensitive device and a valve for controlling the fluid connection, the valve being operated by the pivotal movement of the pressure-sensitive device.

2. In apparatus of the character described, the combination of a chart holder, a pressure-sensitive device pivotally mounted or movement toward and away from the chart holder, a pen arm operatively connected with and carried by the pressure-sensitive device for co-operation with the chart holder, a fluid connection to the pressure-sensitive device, a valve controlling the fluid connection, the pressure-sensitive device and the valve being interconnected so that pivotal movement of the former actuates the latter.

3. In apparatus of the character described, the combination of a chart holder, a pneumatic pressure system, pressure-responsive means connected with the pressure system for moving the chart, a pen arm, pressure-sensitive means connected with the pressure system for moving the pen arm on the chart, means for controlling the connection between the pressure system and the said pressure-sensitive means, means for pivotally moving the pressure-sensitive means and the pen arm as a unit toward and away from the chart and means connected with the pressure-sensitive means for actuating said controlling means concurrently with the pivoted movement of the pressure-sensitive means.

4. In apparatus of the character described, the combination of a chart holder, a pneumatic pressure system, pressure-responsive means connected with the pressure system for moving the chart, a pen arm for cooperation with the chart, pressure-sensitive means for operating the pen arm, a fluid connection between the pressure system and the pressure-sensitive means, and a valve controlling the fluid connection, the pressure-sensitive means being supported on the movable part of the valve for pivotal movement toward and away from the chart, whereby pivotal movement of the pressure-sensitive means causes operation of the valve.

In testimony whereof I affix my signature.

GEORGE B. IRELAND.